United States Patent [19]
Hobson

[11] 4,150,547
[45] Apr. 24, 1977

[54] REGENERATIVE HEAT STORAGE IN COMPRESSED AIR POWER SYSTEM

[76] Inventor: Michael J. Hobson, S 5890 Old Lake Shore Rd., Lakeview, N.Y. 14085

[21] Appl. No.: 833,186

[22] Filed: Sep. 14, 1977

[30] Foreign Application Priority Data

Oct. 4, 1976 [GB] United Kingdom ............... 41116/76

[51] Int. Cl.² .................... F02C 1/00; F28D 17/00
[52] U.S. Cl. ....................................... 60/659; 60/682; 60/652; 165/45; 165/104.5
[58] Field of Search ................ 60/398, 652, 659, 650, 60/682; 165/4, 9.3, DIG. 4, 104.5, 45

[56] References Cited

U.S. PATENT DOCUMENTS

| | | | |
|---|---|---|---|
| 496,107 | 4/1893 | Baker | 165/4 X |
| 1,759,916 | 5/1930 | Riley | 165/4 |
| 1,844,867 | 2/1932 | Byrnes | 165/9.3 X |
| 2,856,506 | 10/1958 | Telkes | 165/DIG. 4 |
| 3,677,008 | 7/1972 | Koutz | 60/659 X |
| 3,715,887 | 2/1973 | Weatherly et al. | 60/682 X |

*Primary Examiner*—Allen M. Ostrager
*Attorney, Agent, or Firm*—Bacon & Thomas

[57] ABSTRACT

A compressed air power plant is disclosed wherein compressed air may be stored underground and later utilized as required. The storage facilities include a heat storage covern which contains an external water barrier and a heat insulating lining. Compressed air flows from the power plant in series through the heat storage cavern and then to an air storage cavern.

5 Claims, 3 Drawing Figures

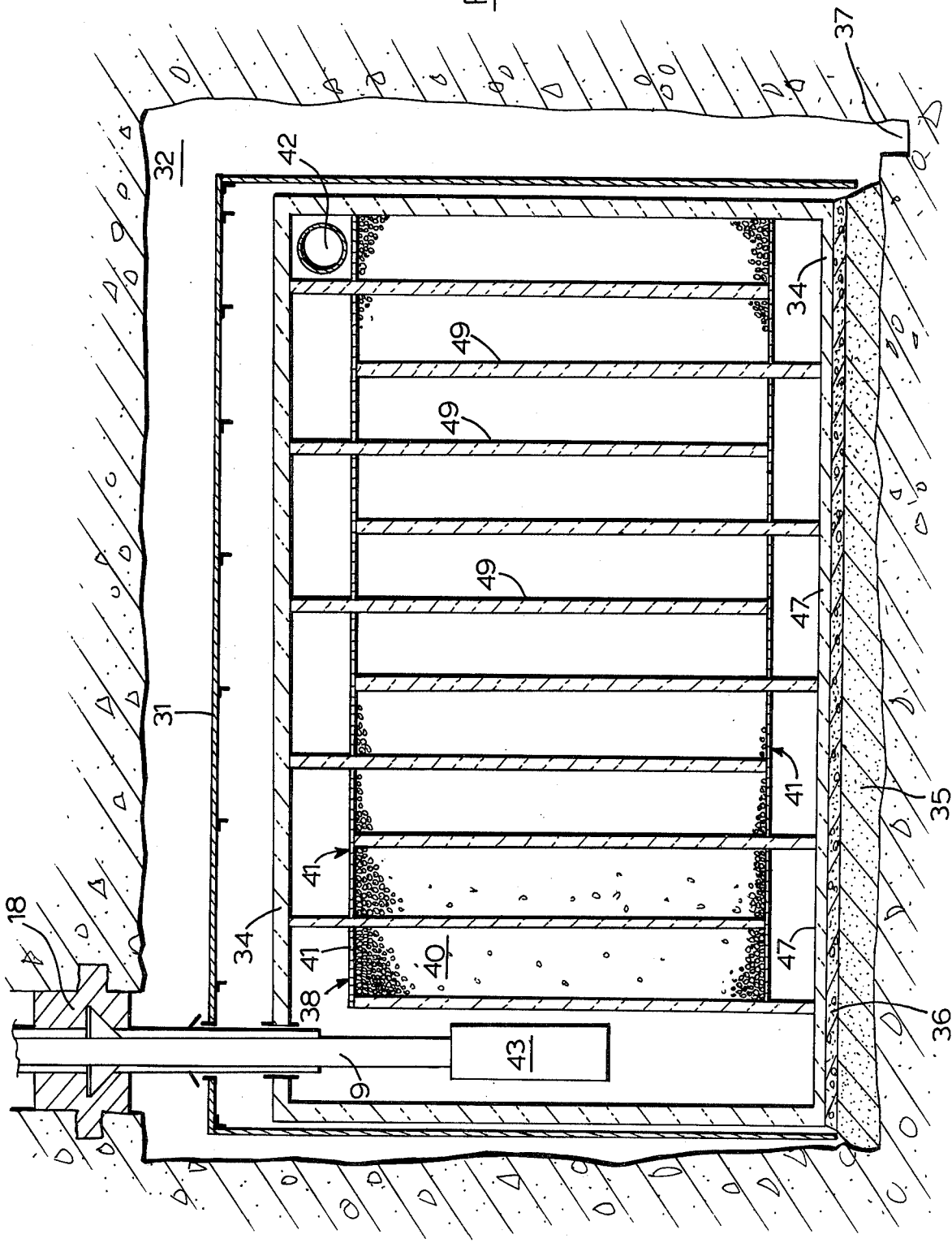

REGENERATIVE HEAT STORAGE IN COMPRESSED AIR POWER SYSTEM

FIELD OF THE INVENTION

This invention relates to compressed air power storage systems in which power is stored by compressing air and passing the latter to a storage cavern, whence it is released as required.

REVIEW OF THE PRIOR ART

Conventional compressed air power storage systems require cooling of the compressed air to 50° C. or below prior to injection into the storage cavern to prevent excessive thermal cycling stresses in the cavern wall. The heat generated during compression is usually rejected to the environment via cooling towers or ponds. If some of this heat of compression could be stored for utilisation during the regeneration of the energy stored in the compressed air, a considerable improvement in efficiency could be achieved.

A proposal to this effect is to be found in U.S. Pat. No. 3,677,008 (S. L. Koutz) issued July 18, 1972. This patent proposes the provision of a heat storage cavern between compression means on the ground surface and a hydrostatically compensated underground air storage cavern. The heat storage medium is crushed rock which fills the heat storage cavern. The possibility of providing heat insulation between the crushed rock and the cavern wall is mentioned, as is the requirement for heat insulation in the air shaft connecting the cavern to the surface.

However, the arrangement proposed in U.S. Pat. No. 3,677,008 still suffers from certain disadvantages. The airflow through the heat storage cavern will tend to be uneven, and this lack of organization of the airflow will cause the temperature of the bed to rise rapidly in regions adjacent the main airflow to a point where high temperature air may be admitted to the storage cavern, again leading to excessive temperature cycling stresses in the cavern wall. Moreover, there will be a gradual general rise of the mean temperature of the heat store, and to some extent in the air storage cavern, over a number of cycles, since thermodynamically the operation of the system will not be entirely reversible. In each cycle, the average temperature of the air entering the heat store on its way into the air storage cavern will be higher than the average temperature of the same mass of air leaving it during energy regeneration. Hence the ability of the heat store to function effectively will gradually degrade.

SUMMARY OF THE INVENTION

According to the present invention, a compressed air power storage system comprises means for generating and utilizing compressed air, a compressed air storage cavern, a heat storage cavern containing a heat storage medium, a first air passage extending between the compressed air generating and utilizing means and the heat storage cavern, and a second air passage extending between the heat storage cavern and the air storage cavern, the internal structure of the heat storage cavern being such as to define a serpentine path through the heat storage medium for air on passing through it between the passages such as to ensure substantially uniform contact between the air and the medium. Preferably a selectively operable aftercooler is connected between the compressor and the heat storage cavern, whereby intermittently to cool the air being passed to the latter so as to correct the gradual rise in mean temperature occurring in the heat storage and air storage caverns.

SHORT DESCRIPTION OF THE DRAWINGS

A preferred embodiment of the invention is illustrated in the accompanying drawings, in which:

FIG. 1 is a diagrammatic representation of a system in accordance with the invention, and FIGS. 2 and 3 are vertical sections on perpendicular axes through the heat storage caverns incorporated in the system.

DESCRIPTION OF THE PREFERRED EMBODIMENT

Figure 1:
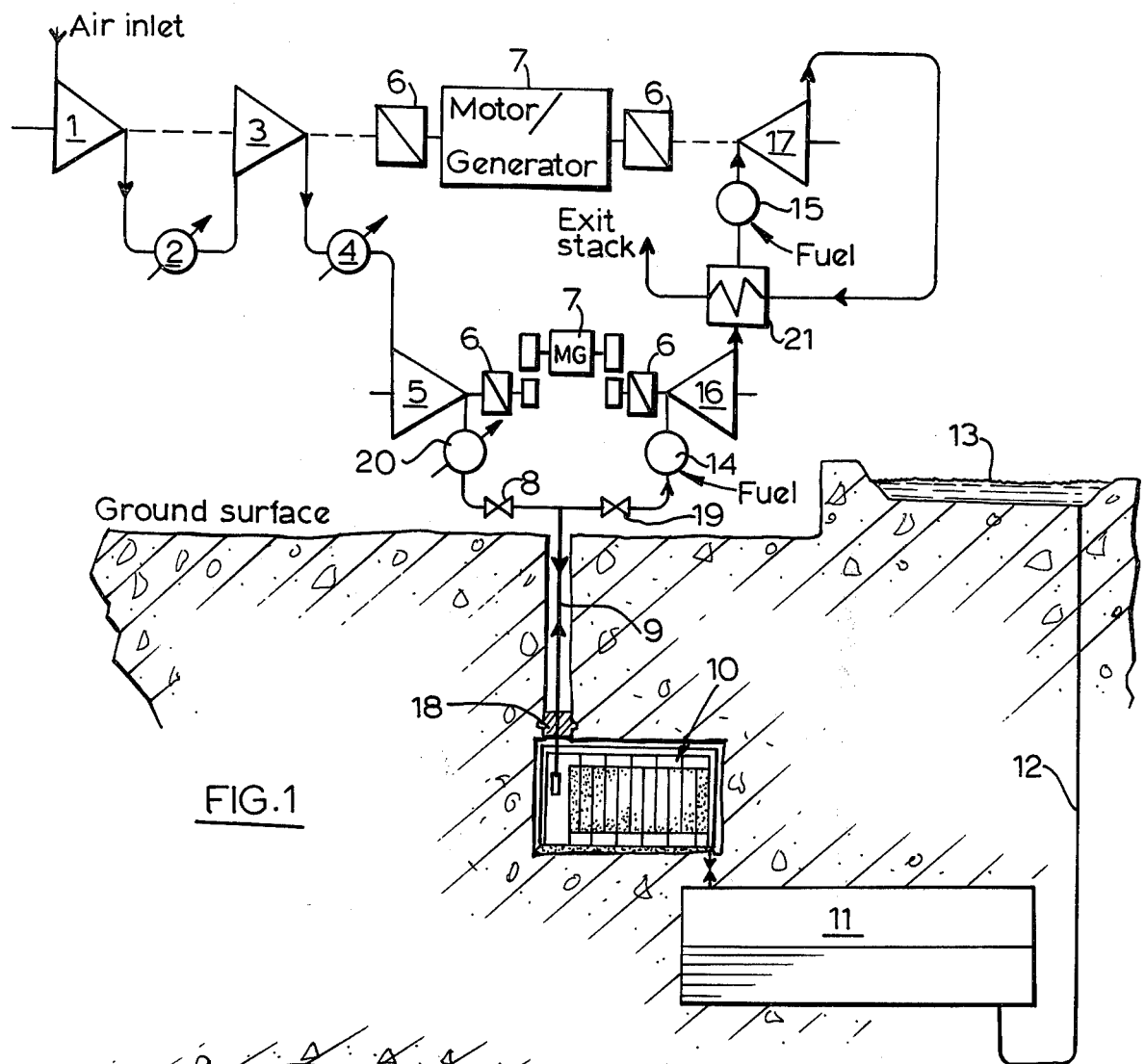

Referring to FIG. 1, and assuming that the compressed air power storage system shown is operating in its compression phase, air enters a low pressure compressor 1 and is discharged through an intercooler 2 to an intermediate compressor 3. An intercooler 4 cools the air from the intermediate pressure compressor 3 prior to its entering a high pressure compressor 5. Compressed air is discharged from the high pressure compressor at temperatures ranging from 200° to 300° C., and thence via a control valve 8 and a normally inoperative aftercooler 20 to an air supply pipe 9 descending through a vertical shaft from the ground surface to a heat storage cavern 10. The pipe 9 is heat insulated and supported in the air shaft in such a manner as to allow vertical expansion, whilst to seal the heat storage cavern against air leakage, a plug 18 is incorporated in the shaft. The hot compressed air passes through the heat storage cavern 10 and is cooled by heat storage medium contained therein; the design of the cavern is described further below with reference to FIGS. 2 and 3. The cooled air leaving the heat storage cavern is discharged to an air storage cavern 11, which is maintained at substantially constant pressure as the entering air displaces water through a shaft 12 into a surface reservoir 13.

During the regeneration phase, air is withdrawn from the cavern 11, through the heat storage cavern 10 where it is reheated by the hot heat storage medium. The heated air rises up the air supply pipe 9, and passes through a valve 19 to a heater 14, where heat may be applied if required to adjust the temperature of the air to a desired level. The hot air is then admitted to a high pressure turbine 16, where after the air is further heated in a heater 15 and admitted to a low pressure turbine 17 whence it discharges to a stack via an optional recuperator 21 which may be utilised to assist in heating the gases passing between the turbines 16 and 17.

The compressors 1, 3 and 5 and the turbines 16 and 17 are coupled by clutches 6 to motor/generators 7, the clutches 6 and the valves 8 and 19 being operated according to whether the system is being used to store energy supplied in the form of electrical energy to the motor/generators 7, or to regenerate stored energy in the form of electrical energy output by the motor/generators.

Figure 2:
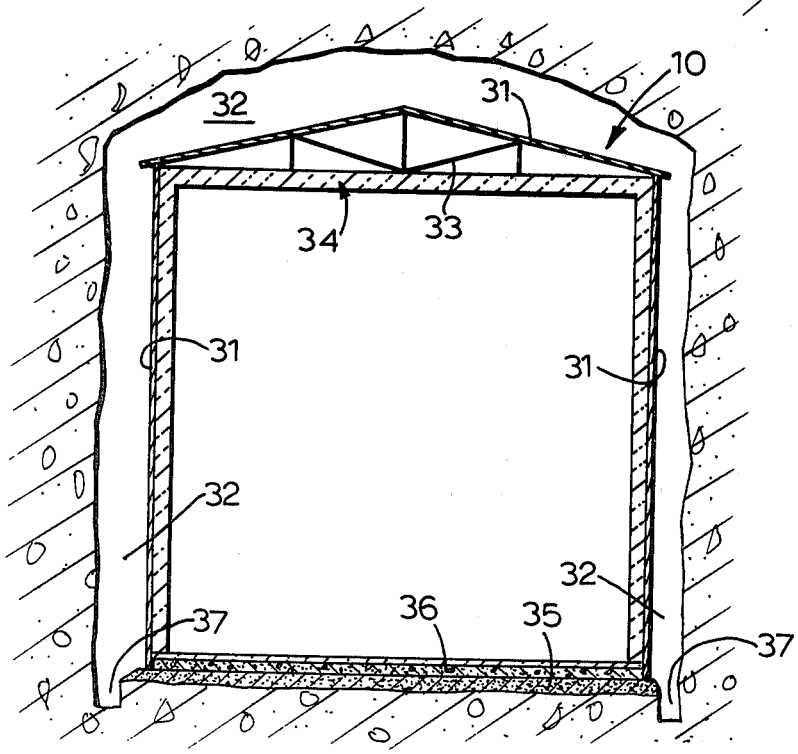

FIG. 2 is a cross section of the heat storage cavern 10 showing a housing for the heat storage medium (the structure internal of the housing is omitted for the sake of clarity). A complete external water barrier 31, constructed of siding and roof sheeting, sheds all water entering the cavity into channels 37 in the rock floor of the cavern. These channels lead to the main air storage cavern which is located adjacent the heat storage cavern and at a lower elevation. The roof sheeting is supported by a light framework 33. A foundation for the housing comprises a granular rock layer 35 and a concrete floor 36. All of inner lining 34 of the housing formed by the barrier 31 and the floor 36 is heat insulated to make the lining heat insulating to retain heat and improve efficiency. Within the insulation are structural members (not shown) for support of the walls and roofs. An access space 32 is provided on all sides of and above the housing for inspection and maintenance purposes, and so as to prevent any possible overheating of the rock surface of the cavern.

Further details of the construction can be seen in FIG. 3. During the compression phase, the hot air enters through the air pipe 9, which is sealed to the rock shaft through which it passes by the seal 18. The air from the pipe 9 enters the housing through a filter 43. The insulation 34 of the housing is not airtight and allows the pressures to equalise in the cavern through the sheeting 31. Air flows from the filter 43 into a first pass 38 of heat storage medium 40 through a distribution plate 41. The storage medium in each pass is confined top and bottom between two such plates 41, which are of perforated metal designed to establish even flow distribution through the material. The material 40, which may be crushed rock, iron scrap or shot, or other heat absorbent material, is sized to inhibit physical breakdown due to temperature cycling and is graded to larger sizes adjacent the top and bottom distribution plates. The weight of the bed in each pass is supported by the lower distribution plate, which in turn is supported by longitudinal beams 47, which maintain even flow distribution in the lateral direction. The several passes of storage medium are defined by interdigitating heat insulating walls 49 extending alternately from the top and bottom insulating walls of the enclosure to the bottom and top distribution plates 41 respectively so as to define a serpentine path for air through the cavern. The number and size of the compartments are selected so as to obtain a reduction in air temperature to approximately 50° C. before the air leaves the cavern through an exit duct 42 to the air storage cavern 11.

The moisture which condenses from the air during cooling is conducted by drain channels beneath the lower plates 41 to the main drain channels 37 in the cavern floor.

When regeneration commences, the air from the main cavern enters the heat storage cavern by the duct 42 and retraces in the opposite direction its previous path through the passes of heat storage medium, in the meanwhile absorbing heat from the hot storage medium. The heated air then passes through the filter 43 to remove any carry over of particulate material, and passes up the supply pipe 9 to the surface plant.

As mentioned above, the aftercooler 20 is normally inoperative, but from time to time it is utilised during the energy storage phase to cool the compressed air before it is passed to the heat storage cavern 10, so as to enable the mean temperature of the latter to be reduced, and thus to compensate for the gradual rise in temperature of the cavern which will occur over a number of operating cycles due to the imperfect efficiency of the cycle.

What I claim is:

1. A compressed air power storage system comprising means for generating and utilizing compressed air, a compressed air storage cavern, a heat storage cavern containing a heat storage medium, a first air passage extending between the compressed air generating and utilizing means and the heat storage cavern, a second air passage extending between the heat storage cavern and the air storage cavern, and a housing for the heat storage medium within the heat storage cavern, said housing being spaced from the walls and roof of the cavern and having an external water barrier, a heat insulating lining within the barrier, and internal structure defining a serpentine path through the heat storage medium for passing air between the passages so as to ensure substantially uniform contact between the air and the medium.

2. A compressed air power storage system according to claim 1, wherein a selectively operable aftercooler is connected between the compressed air generating means and the first passage.

3. A compressed air power storage system according to claim 1, wherein the space within the lining is divided in a plurality of passes by interdigitating walls so as to define said serpentine path, the heating storage medium being retained between the interdigitating portions of said walls.

4. A compressed air power storage system according to claim 3, wherein the heat storage cavern comprises drainage channels to capture water condensing in the heat store medium and shed from the external water barrier.

5. A compressed air power storage system according to claim 1, wherein the means for generating and utilizing the compressed air comprise low and high pressure compressors connected in series, and high and low pressure turbines, the low pressure compressor and turbine being connected to a first motor/generator and the high pressure compressor and turbine being connected to a second motor/generator.

* * * * *